(12) United States Patent
Liu et al.

(10) Patent No.: US 9,058,382 B2
(45) Date of Patent: *Jun. 16, 2015

(54) AUGMENTING A TRAINING SET FOR DOCUMENT CATEGORIZATION

(75) Inventors: Tie-Yan Liu, Beijing (CN); Wei-Ying Ma, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 414 days.

This patent is subject to a terminal disclaimer.

(21) Appl. No.: 12/254,798

(22) Filed: Oct. 20, 2008

(65) Prior Publication Data

US 2009/0043764 A1  Feb. 12, 2009

Related U.S. Application Data

(63) Continuation of application No. 11/273,714, filed on Nov. 14, 2005, now Pat. No. 7,457,801.

(51) Int. Cl.
*G06F 7/00* (2006.01)
*G06F 17/30* (2006.01)

(52) U.S. Cl.
CPC .................................. *G06F 17/3071* (2013.01)

(58) Field of Classification Search
CPC .......... G06F 15/17362; G06F 17/2241; G06F 17/30073; G06F 17/30221; G06F 17/30589; G06F 17/30643; G06F 17/30; G06F 17/3071
See application file for complete search history.

(56) References Cited

U.S. PATENT DOCUMENTS

| | | | |
|---|---|---|---|
| 4,999,790 A | 3/1991 | Murayama et al. | |
| 5,875,446 A | 2/1999 | Brown et al. | |
| 5,895,470 A * | 4/1999 | Pirolli et al. | 707/727 |
| 6,366,910 B1 | 4/2002 | Rajaraman et al. | |
| 6,606,620 B1 * | 8/2003 | Sundaresan et al. | 1/1 |
| 6,792,475 B1 * | 9/2004 | Arcuri et al. | 709/245 |
| 6,826,576 B2 * | 11/2004 | Lulich et al. | 707/740 |
| 6,947,936 B1 * | 9/2005 | Suermondt et al. | 1/1 |
| 7,031,961 B2 | 4/2006 | Pitkow et al. | |
| 7,043,468 B2 * | 5/2006 | Forman et al. | 706/46 |
| 7,089,237 B2 | 8/2006 | Turnbull et al. | |
| 7,139,745 B2 | 11/2006 | Nakamura et al. | |
| 7,188,117 B2 | 3/2007 | Farahat et al. | |
| 7,231,395 B2 | 6/2007 | Fain et al. | |
| 7,567,958 B1 * | 7/2009 | Alspector et al. | 1/1 |
| 8,028,059 B1 * | 9/2011 | O'Laughlen et al. | 709/224 |
| 2005/0050029 A1 * | 3/2005 | Suzuki | 707/3 |

(Continued)

OTHER PUBLICATIONS

U.S. Appl. No. 11/183,318, Yan et al.

(Continued)

*Primary Examiner* — Azam Cheema

(74) *Attorney, Agent, or Firm* — Sandy Swain; Judy Yee; Micky Minhas

(57) ABSTRACT

A method and system for augmenting a training set used to train a classifier of documents is provided. The augmentation system augments a training set with training data derived from features of documents based on a document hierarchy. The training data of the initial training set may be derived from the root documents of the hierarchies of documents. The augmentation system generates additional training data that includes an aggregate feature that represents the overall characteristics of a hierarchy of documents, rather than just the root document. After the training data is generated, the augmentation system augments the initial training set with the newly generated training data.

19 Claims, 4 Drawing Sheets

(56) References Cited

U.S. PATENT DOCUMENTS

| | | | |
|---|---|---|---|
| 2006/0031673 A1 | 2/2006 | Beck et al. | |
| 2007/0022287 A1 | 1/2007 | Beck et al. | |
| 2007/0112753 A1 | 5/2007 | Liu et al. | |

OTHER PUBLICATIONS

"AppInit_DLLs Registry Value and Windows 95," Microsoft Corporation, Article ID 134655, last review Mar. 1, 2005, revision 3.2, 2 pages, http://support.microsoft.com/kb/134655/.

"How to Use the Windiff.exe Utility," Microsoft Knowlege Base Article—159214, Copyright 2004, Microsoft Corporation (3 pages) http://support.microsoft.com/default.aspx?scid=kb;en-us;159214.

"Working with the AppInit_DLLs registry value," Microsoft Corporation, Article ID 197571, last review Feb. 19, 2005, revision 4.0, 1 page, http://support.microsoft.com/default.aspx?scid=kb;en-us;197571.

Altunergil, Oktay, "Scanning for Rootkits," Linux Devcenter.com, Feb. 7, 2002 (8 pages).

Altunergil, Oktay, "Understanding Rootkits," Linus Devcenter.com, Dec. 14, 2001 (3 pages).

An Intelligent Web-Page Classifier with fair Feature-Subset Selection, Hahn-Ming Lee, Chih-Ming Chen and Chia-Chen Tan, 2001 IEEE.

Baker, L. Douglas and Andrew Kachites McCallum, "Distributional Clustering of Words for Text Classification," SIGIR '98, Australia, ACM 1998, pp. 96-103.

BIOS Boot Specification, Compaq Computer Corporation, Phoenix Technologies, Ltd., Intel Corporation, Version 1.01, Jan. 11, 1996 (46 pages).

Busleiman, Arturo, "Detecting and Understanding Rootkits," Sep. 2003 (13 pages).

Calvo, Rafael A., Jae-Moon Lee and Xiaobo Li, "Managing content with automatic document classification," Journal of Digital Information, vol. 5, No. 282, 2004.

Dittrich, "Root Kits" and Hiding Files/Directories/Processes After a Break-in, Jan. 2002 (12 pages).

Dumais, Susan and Hao Chen, "Hierarchical Classification of Web Content," SIGIR 2000, 8 pages.

Dumais, Susan, John Platt, David Heckerman and Mehran Sahami, "Inductive Learning Algorithms and Representations for Text Categorization," Proceedings of the Seventh International Conference on Information and Knowledge Management, 1998, 8 pages.

Feng, Guang, Tie-Yan Liu, Xu-Dong Zhang, Tao Qin, Bin Gao and Wei-Ying Ma, "Level-Based Link Analysis," AP Web, 2005, 12 pages.

holy_father@phreaker.net, "Invisibility on NT boxes—How to become unseen on Windows NT," Code Breakers Journal, vol. 1, No. 2 (2004), May 8, 2003, 26 pages.

Huang, Chien-Chung, Shui-Lung Chuang and Lee-Feng Chien, "LiveClassifier: Creating Hierarchical Text Classifiers through Web Corpora," WWW 2004, New York, ACM 2004, pp. 184-192.

Iwayama, Makoto, Atsushi Fujii, Noriko Kando and Yuzo Marukawa, "An Empirical Study on Retrieval Models for Different Document Genres: Patents and Newspaper Articles," SIGIR '03, Toronto, Canada, ACM 2003, pp. 251-258.

Joachims, Thorsten, "Text Categorization with Support Vector Machines: Learning with Many Relevant Features," Proceedings of the European Conference on Machine Learning ECML, Springer 1998, 7 pages.

Joachims, Thorsten, "Transductive Inference for Text Classification using Support Vector Machines," Proceedings of the International Conference on Machine Learning ICML, 1999, 10 pages.

Kodmaker@syshell.org, "NTIllusion: A Portable Win 32 userland rootkit," Phrack Inc., vol. 0x0b, Issue 0x3e, Phile #0x0c of 0x10, Jul. 13, 2004, 28 pages.

Lam, Wai and Chao Yang Ho, "Using A Generalized Instance Set for Automatic Text Categorization," SIGIR '98, Melbourne, Australia, ACM 1998, pp. 81-89.

Larkey, Leah S. and W. Bruce Croft, "Combining Classifiers in Text Categorization," SIGIR'96, Zurich, Switzerland, ACM 1996, pp. 289-297.

Lewis, David D., "An Evaluation of Phrasal and Clustered Representations on a Text Categorization Task," 15th Annual SIGIR'92, Denmark, ACM 1992, pp. 37-50.

Lewis, David D., Yiming Yang, Tony G. Rose and Fan Li, "RCV1: A New Benchmark Collection for Text Categorization Research," Journal of Machine Learning Research 5 (2004), pp. 361-397.

Liu, Tie-Yan, Hao Wan, Tao Qin, Zheng Chen, Young Ren and Wei-Ying Ma, "Site Abstraction for Rare Category Classification in Large-Scale Web Directory," WWW 2005, Japan, ACM 2005, pp. 1108-1109.

Makoto, Iwayama and Tokunaga Takenobu, "Cluster-Based Text Categorization: A Comparison of Category Search Strategies," ISSN 0918-2802, Technical Report 95-TR0016, Aug. 1995, 15 pages.

Masand, Brij, Gordon Linoff and David Waltz, "Classifying News Stories using Memory Based Reasoning," 15th Annual International SIGIR'92, Denmark, ACM 1992, pp. 59-65.

McCallum, Andrew and Kamal Nigam, "A Comparison of Event Models for Naive Bayes Text Classification," AAAI '98 Workshop on "Learning for Text Categorization," 1998, 8 pages.

McCallum, Andrew, Ronald Rosenfeld, Tom Mitchell and Andrew Y. Ng, "Improving Text Classification by Shrinkage in a Hierarchy of Classes," Proceedings of ICML-98, 15th International Conference on Machine Learning, 1998, 9 pages.

Muttik, Igor, "Stripping Down an AV Engine," Virus Bulletin Conference, Sep. 2000, pp. 59-68.

NISCC Technical note Aug. 2003, "Trojan Horse Programs and Rootkits", Issued: Sep. 10, 2003.

NTQuerySystemInformation, Microsoft, Jul. 2005, 4 pages, http://msdn.microsoft.com/library/en-us/sysinfo/base/ntquerysysteminformation.asp?frame=true.

Poulsen, Kevin, "Windows Root Kits a Stealthy Threat," SecurityFocus News, Mar. 5, 2003 (3 pages).

Poulsen, Kevin, "Windows Root Kits a Stealthy Threat," The Register, SecurityFocus Online, Mar. 7, 2003 (3 pages).

Schneier, Bruce, "Schneier on Security:—A weblog covering security and security technology: GhostBuster," Feb. 15, 2005, 9 pages, http://www.schneier.com/blog/archives/2005/02/ghostbuster.html.

T.Garfinkel and M. Rosenblum, "A Virtual Machine Introspection Based Architecture for Intrusion Detection", In Proceedings of the Symposium on Network and Distributed Systems Security (SNDSS), pp. 191-206, Feb. 2003.

Tseng, Yuen-Hsien and Da-Wei Juang, "Document-Self Expansion for Text Categorization," SIGIR '03, Toronto, Canada, ACM 2003, pp. 399-400.

Wang, Yi Min, Binh Vo, Roussi Roussev, Chad Verbowski and Aaron Johnson, "Strider Ghostbuster: Why It's a Bad Idea for Stealth Software to Hide Files," Jul. 24, 2004, Microsoft Technical Report MSR-TR-2004-71, (15 pages).

Wang, Yi-Min and Doug Beck, "How to 'Root' a Rootkit That Supports Root Processes Using Strider Ghostbuster Enterprise Scanner," Microsoft Technical Report MSR-TR-2005-21, Feb. 11, 2005, Microsoft Research, 2 pages.

Wang, Yi-Min, Binh Vo, Roussi Roussev, Chad Verbowski and Aaron Johnson, "Strider GhostBuster: Why It's a Bad Idea for Stealth Software to Hide Files," Microsoft Research Technical Report MSR-TR-2004-71, Jul. 24, 2004, pp. 1-15.

Wang, Yi-Min, Doug Bech, Binh Vo, Roussi Roussev and Chad Verbowski, "Detecting Stealth Software with Strider GhostBuster," Microsoft Research Technical Report MSR-TR-2005-25, Feb. 21, 2005, 11 pages.

Wang, Yi-Min, Roussi Roussev, Chad Verbowski, Aaron Johnson and David Ladd, "AskStrider: What Has Changed on My Machine Lately?," Microsoft Research Technical Report MSR-TR-2004-03, Jan. 5, 2004, 13 pages.

Wibowo, Wahyu and Hugh E. Williams, "Strategies for Minimising Errors in Hierarchical Web Categorisation," CIKM'02, Virginia, 2002 ACM, pp. 525-531.

Yang, Yiming and Jan O. Pedersen, "A Comparative Study on Feature Selection in Text Categorization," Proceedings of ICML-97, 14th International Conference on Machine Learning, 1997, 9 pages.

(56) References Cited

OTHER PUBLICATIONS

Yang, Yiming and Xin Liu, "A re-examination of text categorization methods," 22nd Annual International SIGIR, ACM 1999, 8 pages.
Yang, Yiming, "A Study on Thresholding Strategies for Text Categorization," SIGIR'01, New Orleans, Louisiana, ACM 2001, 9 pages.
Yang, Yiming, Jian Zhang and Bryan Kisiel, "A Scalability Analysis of Classifiers in Text Categorization," SIGIR'03, Toronto, Canada, ACM 2003, pp. 96-103.
Adobe, http://livedocs.adobe.com/director/mx2004/release_update_en/wwhelp/wwhimpl/common/html/wwhelp.htm?context=Director_MX_2004_Documentation&file=07_me267.htm (Accessed Feb. 18, 2009).
FOLDOC: Cache, 1997, http://foldoc.org/index.cgi?query=cache&action=Search (Accessed: Feb. 19, 2009).
Ding, C., et al., "A Generalized Site Ranking Model for Web IR," Web Intelligence, 2003, WI 2003, Proceedings, IEEE/WIC International Conference on Oct. 13-17, 2003 (4 pages).
Euclidean Vector, http://en.wikipedia.org/wiki/Euclidean_vector (Accessed: Feb. 18, 2009).
European Search Result for EP Application No. 06837625.0, dated Feb. 26, 2010, 7 papes.
International Search Report for International Application No. PCT/US006/044280, Microsoft Corporation, Apr. 23, 2007 (3 pages).
Kesson, 2002, http://www.fundza.com/vectors/normalize/index.html (Accessed: Feb. 18, 2009).
Ponte et al., "A Language Modeling Approach to Information Retrieval," ACM, SIGIR 98, pp. 275-281.
Simmons, Jul. 29, 2008, http://www.mathwords.com/n/normalizing_a_vector.htm (Accessed: Feb. 18, 2009).
Song et al., Microsoft Research Asia at Web Track and Terabyte Track of Trec 2004, Nov. 16-19, 2004, 12 pages.
Vorhees, Overview of TREC 2004, Nov. 18-19, 2004, 1 page.
Weisstein, 1999-2009, http://mathworld.wolfram.com/NormalizedVector.html (Accessed: Feb. 18, 2009).

* cited by examiner

AUGMENTING A TRAINING SET FOR DOCUMENT CATEGORIZATION

CROSS REFERENCE TO RELATED APPLICATION

This application is a continuation application of U.S. patent application Ser. No. 11/273,714, filed on Nov. 14, 2005, and entitled "AUGMENTING A TRAINING SET FOR DOCUMENT CATEGORIZATION," which is incorporated herein in its entirety by reference.

BACKGROUND

Many search engine services, such as Google and Overture, provide for searching for information that is accessible via the Internet. These search engine services allow users to search for display pages, such as web pages, that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of base web pages to identify all web pages that are accessible through those base web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Although search engine services may return many web pages as a search result, the presenting of the web pages in relevance order may make it difficult for a user to actually find those web pages of particular interest to the user. Since the web pages that are presented first may be directed to popular topics (e.g., when the ordering is based on Google's PageRank), a user who is interested in an obscure topic may need to scan many pages of the search result to find a web page of interest. To make it easier for a user to find web pages of interest, the web pages of a search result could be presented in a hierarchical organization based on some classification or categorization of the web pages. For example, if a user submits a search request of "court battles," the search result may contain web pages that can be classified as sports-related or legal-related. The user may prefer to be presented initially with a list of classifications of the web pages so that the user can select the classification of web pages that is of interest. For example, the user might be first presented with an indication that the web pages of the search result have been classified as sports-related and legal-related. The user can then select the legal-related classification to view web pages that are legal-related. In contrast, since sports web pages are more popular than legal web pages, a user might have to scan many pages to find legal-related web pages if the most popular web pages are presented first. Alternatively, the user may be presented with a hierarchy of classifications. The user may select a classification when the user submits a search request. In this case, the search engine would limit the search to web pages within the selected classification.

It would be impractical to manually classify the millions of web pages that are currently available. Although automated classification techniques have been used to classify text-based content, those techniques are not generally applicable to the classification of web pages. Web pages have an organization that includes noisy content, such as an advertisement or a navigation bar, that is not directly related to the primary topic of the web page. Because conventional text-based classification techniques would use such noisy content when classifying a web page, these techniques would tend to produce incorrect classifications of web pages. Moreover, although many attempts have been made to classify web pages, they have generally not been able to effectively classify web pages into hierarchical classifications. A major reason for the inability to effectively classify the web pages is that some of the classifications have very few web pages. Because of the sparseness of web pages in certain classifications, it can be difficult to identify a large enough training set of web pages for training of a classifier for those classifications.

SUMMARY

A method and system for augmenting a training set used to train a classifier of documents is provided. The augmentation system augments a training set with training data derived from features of documents based on a document hierarchy. The training data (i.e., feature and classification) of the initial training set may be derived from the root documents of hierarchies of documents. The augmentation system generates additional training data that includes an aggregate feature that represents the overall characteristics of a hierarchy of documents, rather than just the root document. The augmentation system may exclude the feature of the root document from the generated training data since the feature of the root document is already included in the initial training set. After the additional training data is generated, the augmentation system augments the initial training set with the additional training data. After the training set is augmented, the augmented training set can be used to train the classifier for classifying the documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
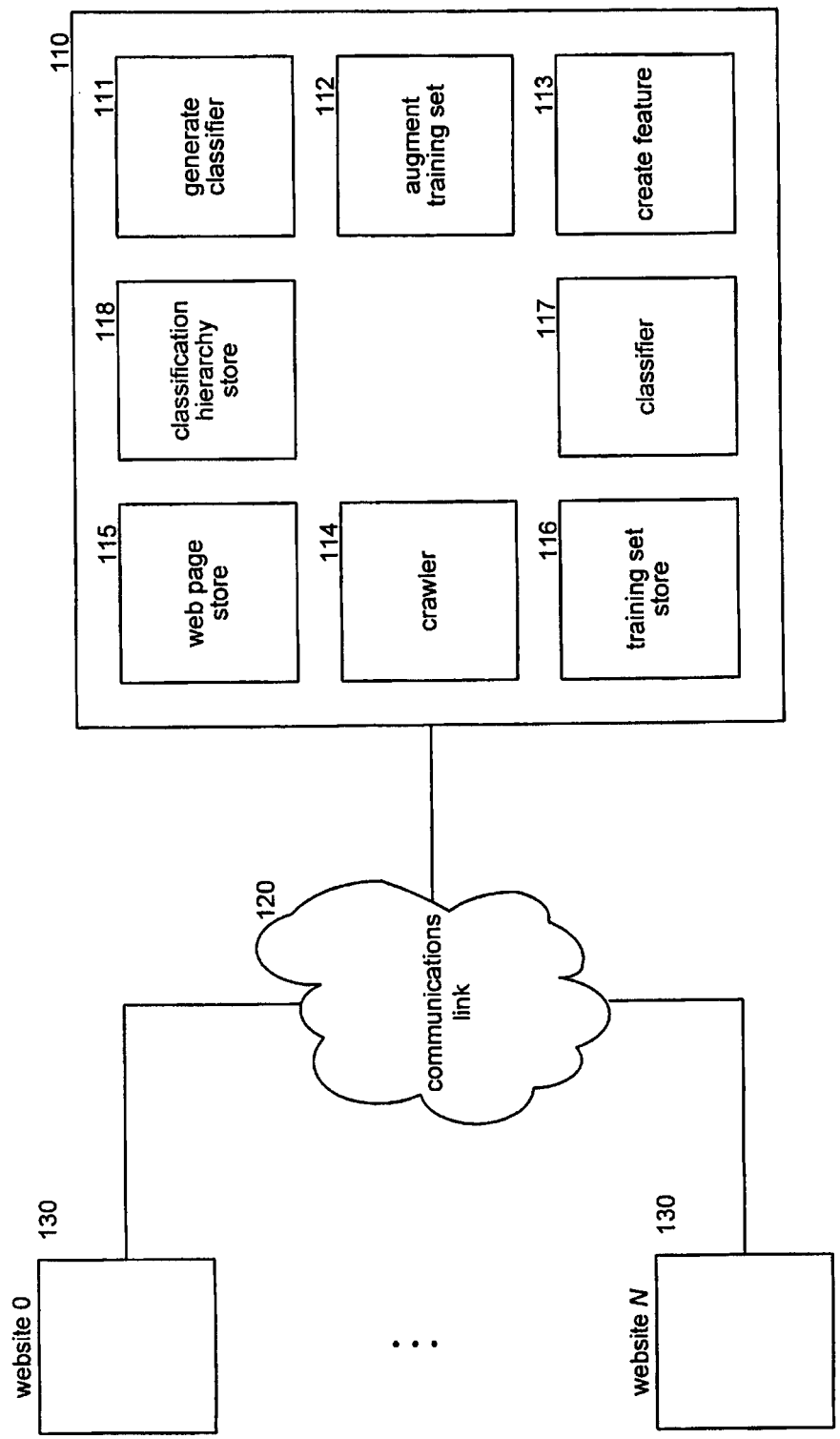
FIG. 1 is a block diagram that illustrates components of the augmentation system in one embodiment.

A method and system for augmenting a training set used to train a classifier of documents is provided. In one embodiment, the augmentation system augments a training set with training data derived from features of documents based on a document hierarchy. The training data of the training set may include a feature for each document of the training set along with a classification of the document. The feature of a document represents a characteristic or characteristics of the document upon which the classification of the document may depend. For example, the feature of a document may be represented as a word feature vector that includes an element for each keyword of the document that indicates the number of occurrences or frequency of that keyword within that document. The initial training data (i.e., feature and classification) of the training set may be derived from the root document of a hierarchy of documents. For example, when the documents are web pages, the initial training data may represent web sites and may be derived from the root web page of the web sites. The augmentation system generates training data that includes an aggregate feature that represents the overall characteristics of a hierarchy of documents, rather than just the root document. For example, the augmentation system may generate a feature for each web page of a web site and aggregate the features of the web pages into an aggregate feature that represents the web site, rather than just using the root web page as representative of the web site. The augmentation system may exclude the feature of the root document from the generated training data since the feature of the root document is already included in the training set. After the training data is generated, the augmentation system augments the initial training set with the newly generated training data. After the training set is augmented, the augmented training set can be used to train the classifier for classifying the documents. In this way, additional training data can be provided for a classification that may not otherwise have sufficient training data. Also, an aggregated feature can be provided that more accurately represents the characteristics of a hierarchy of documents.

In one embodiment, the augmentation system uses the hierarchical organization of web pages of a web site to specify parent/child relations, which are also referred to as the ancestor/descendent relations. The hierarchy of a web site may be defined by the uniform resource locators ("URL") of the web pages. For example, the web page with the URL "www.va.gov" may be the common ancestor of all the web pages of the web site, which is also referred to as the root web page of the web site. Child web pages of the root web page may include "www.va.gov/disclaim.htm" and "www.va.gov/resdev." One skilled in the art will appreciate that various techniques may be used to identify the hierarchical relations or structure of documents and in particular web sites. For example, the hierarchical structure of a web site may be derived from a site map included as a web page of the web site or may be derived from the intra-site links between web pages.

In one embodiment, the augmentation system generates a feature of a web site that represents the overall characteristics of the web pages within that web site. More generally, the augmentation system generates a feature that represents the overall characteristics of a hierarchy of documents. The augmentation system may generate a feature for each web page of a web site that is based on the feature of the web page itself and the features of descendent web pages. For example, a web page may have a word feature vector of (10, 0, 5) indicating that it contains 10 occurrences of the keyword "court," 0 occurrences of the keyword "lawyer," and 5 occurrences of the keyword "battle." The web page may have two child web pages with the word feature vectors of (5, 5, 5) and (7, 11, 3).

The augmentation system may calculate the aggregate word feature vector for the web page according to the following equation:

$$F^*(p_k) = \begin{cases} F(p_k), & \text{CHILD}(p_k) = \Phi \\ F(p_k) + \alpha \dfrac{\sum_{p_{k+1} \in \text{CHILD}(p_k)} F^*(p_{k+1})}{|\text{CHILD}(p_k)|}, & k > 1 \text{ and CHILD}(p_k) \neq \Phi \\ \alpha \dfrac{\sum_{p_{k+1} \in \text{CHILD}(p_k)} F^*(p_{k+1})}{|\text{CHILD}(p_k)|}, & k = 1 \text{ and CHILD}(p_k) \neq \Phi \end{cases} \quad (1)$$

where $F^*(p_k)$ represents the aggregate feature for document $p_k$ at level k of the hierarchy, $F(p_k)$ represents the feature for document $p_k$ itself, $\text{CHILD}(p_k)$ represents the set of child documents of $p_k$, $\|$ represents the number of documents in a set, $\Phi$ represents the empty set, and $\alpha$ represents the weighting factor when aggregating features of child documents. According to this equation, the feature of the root document of a hierarchy is not factored into the aggregation. If a training set already has training data representing the root document of a hierarchy, then the equation can be used to prevent the feature of the root document from being factored a second time into the training set. When the aggregate word feature vector is determined according to this equation, the result is (13, 4, 7) when $\alpha$ is 0.5 (i.e., (10, 0, 5)+0.5*((5+7)/2, (5+11)/2, (5+3)/2)). The augmentation system may calculate the aggregate word feature vector for a web page with child web pages according to the following equation:

$$F'(p_k) = F(p_k) + \alpha \dfrac{\sum_{p_{k+1} \in \text{CHILD}(p_k)} F(p_{k+1})}{|\text{CHILD}(p_k)|} \quad (2)$$

where $F'(p_k)$ represents the aggregated feature for web page $p_k$, $F(p_k)$ represents the feature for web page $p_k$ itself, CHILD $(p_k)$ represents the set of child web pages of $p_k$, $\|$ represents the number of web pages in a set, and $\alpha$ represents the weighting factor when aggregating features of child web pages. In this equation, the feature of a web page is only based on the feature of the web page itself and the feature of the child web pages themselves. That is, the features only propagate up one level in the hierarchy. More generally, the feature of a document may be based on features of both descendent and ancestor documents. In such a case, the features for a hierarchy of documents may be calculated iteratively until the features converge.

FIG. 1 is a block diagram that illustrates components of the augmentation system in one embodiment. The augmentation system 110 is connected to web sites 130 via communications link 120. The augmentation system includes a generate classifier component 111, an augment training set component 112, a create feature component 113, a crawler component 114, a web page store 115, a training set store 116, a classifier component 117, and a classification hierarchy store 118. The crawler component crawls the various web sites to identify the web pages of the web sites along with their hierarchical organization and stores the web page information in the web page store. The training set store contains the features of selected root web pages of web sites from the web page store along with their classification. The classification hierarchy store contains the hierarchical organization of the classifications for the web pages. The generate classifier component augments the training set based on web pages other than the root web page of a web site and trains the classifier using the augmented training data. The generate classifier component invokes the augment training set component to augment the training set, which in turn invokes the create feature component to create a feature that is representative of the hierarchy of web pages of the web site.

In one embodiment, the classifier may be based on a support vector machine that operates by finding a hyper-surface in the space of possible inputs. The hyper-surface attempts to split the positive examples from the negative examples by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~jplatt/smo.html.)

The computing device on which the augmentation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the augmentation system. In addition, the data structures and message structures may be stored or transmitted via a data transmission medium, such as a signal on a communications link. Various communications links may be used, such as the Internet, a local area network, a wide area network, or a point-to-point dial-up connection.

The augmentation system may be implemented in various operating environments that include personal computers, server computers, multiprocessor systems, microprocessor-based systems, programmable consumer electronics, network PCs, minicomputers, mainframe computers, distributed computing environments that include any of the above systems or devices, and the like.

The augmentation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
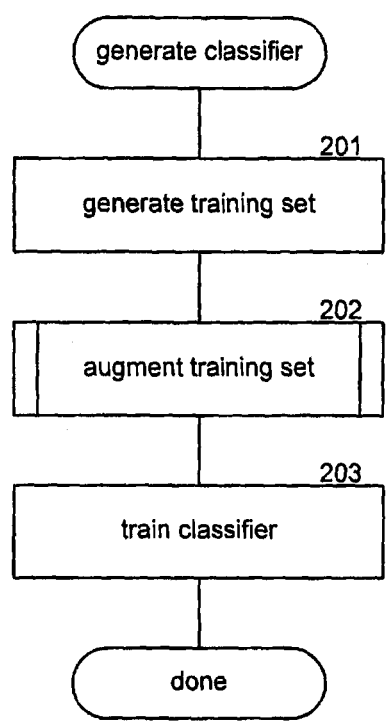
FIG. 2 is a flow diagram that illustrates the processing of the generate classifier component of the augmentation system in one embodiment.

FIG. 2 is a flow diagram that illustrates the processing of the generate classifier component of the augmentation system in one embodiment. The generate classifier component generates the training set, augments the training set with newly generated training data, and then trains the classifier using the augmented training set. In block 201, the component generates the training set using conventional techniques. For example, the component may identify the root web pages of web sites selected for the training set, generate a feature for the root web pages, and then input a classification from a user for each web site. In block 202, the component augments the training set with training data derived from the descendent web pages of the root web page of the web sites. In block 203, the component trains the classifier based on the training set as augmented.

Figure 3:
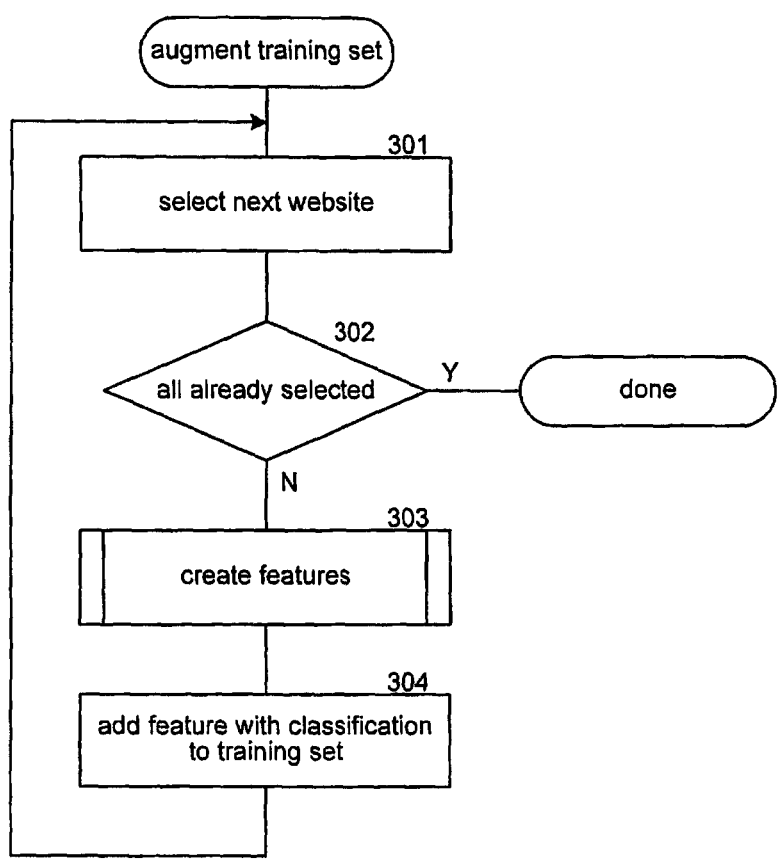
FIG. 3 is a flow diagram that illustrates the processing of the augment training set component of the augmentation system in one embodiment.

FIG. 3 is a flow diagram that illustrates the processing of the augment training set component of the augmentation system in one embodiment. The component generates training data based on the non-root web pages of the web sites represented in the training set. In block 301, the component selects the next web site of the training set. In decision block 302, if all the web sites have already been selected, then the component completes, else the component continues at block 303. In block 303, the component invokes the create feature component to create a feature for the non-root web pages of the selected web site. In block 304, the component adds the created feature along with the classification of the selected web site as training data to the training set and then loops to block 301 to select the next web site in the training set.

Figure 4:
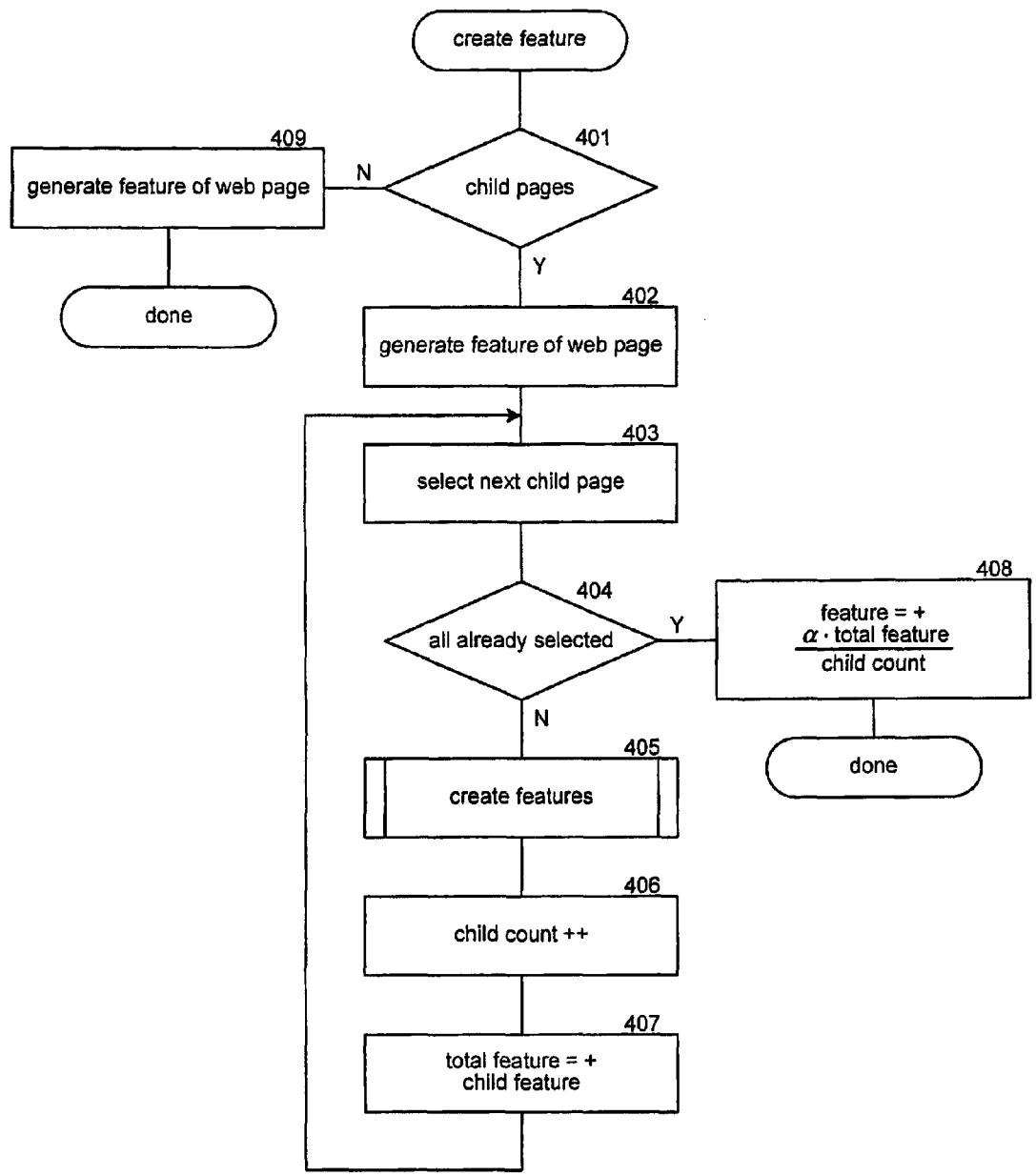
FIG. 4 is a flow diagram that illustrates the processing of the create feature component of the augmentation system in one embodiment.

FIG. 4 is a flow diagram that illustrates the processing of the create feature component of the augmentation system in one embodiment. The component is invoked recursively to perform a depth first traversal of the hierarchy of web pages. The component aggregates the features of the web pages during the traversal. The component is passed a web page. In decision block 401, if the passed web page has child web pages, then the component continues at block 402, else the component continues at block 409. In block 402, the component generates a feature for the passed web page. In one embodiment, the component may not factor in the feature of the root web page of a web site to avoid duplicate factoring in of that feature in the training set since the training set before augmentation already includes training data for the root web pages. In blocks 403-407, the component loops selecting child web pages of the passed web page and accumulating their contributions to the feature. In block 403, the component selects the next child web page of the passed web page. In decision block 404, if all the child web pages have already been selected, then the component continues at block 408, else the component continues at block 405. In block 405, the component recursively invokes the create feature component passing the selected child web page. In block 406, the component increments the count of the child web pages. In block 407, the component accumulates the feature of the selected child web page to the total of all the features for the child web pages. The component then loops to block 403 to select the next child web page. In block 408, the component calculates the feature for the passed web page as the feature generated in block 402 plus a weighted average feature of the child web pages. The weighting of the features of the child web pages may result in an exponential decay of the contribution of a feature of a web page based on the distance of descendent web pages. The component then returns. In block 409, the passed web page is a leaf web page and the component generates the feature of the web page and returns.

Although the subject matter has been described in language specific to structural features and/or methodological acts, it is to be understood that the subject matter defined in the appended claims is not necessarily limited to the specific features or acts described above. Accordingly, the invention is not limited except as by the appended claims.

We claim:

1. A method performed by a computing device for generating a feature from a hierarchy of documents, the method comprising:

providing a hierarchical organization of the documents, the hierarchical organization specifying parent/child relations between documents, one of the documents being a root document of the hierarchical organization that has no parent document, some of the documents of the hierarchical organization being leaf documents that have no child documents, each document other than the root document and the leaf documents having both a parent document and a child document, the parent/child relations occurring when a parent document contains a reference to a child document;

generating a feature for each of the documents in the hierarchical organization of documents; and for each document, generating an aggregate feature from the generated features of the documents to represent the feature for the document by combining the generated feature for that document with the generated aggregate features for child documents of that document to generate an aggregate feature for that document by summing the features for child documents of that document, dividing that sum by the number of child documents to generate a quotient, and multiply the quotient by a weighting factor so that each document in the hierarchical organization with a child document has an aggregate feature derived from the generated feature for that document and the aggregate features of the child documents of that document.

2. The method of claim 1 wherein the feature represents frequencies of keywords within a document.

3. The method of claim 1 wherein the feature for a document is an aggregate of the features of the document and its descendent documents.

4. The method of claim 3 wherein the feature for a document is aggregated by
   when the document has no child document as indicated by the hierarchical organization, setting the feature of the document using the document; and
   when the document has a child document as indicated by the hierarchical organization hierarchy, setting the feature of the document using the document and using the child document.

5. The method of claim 1 wherein the feature for a document is an aggregate of the features of ancestor and descendent documents.

6. The method of claim 1 wherein the documents are web pages.

7. The method of claim 1 including:
   providing a training set having, for each of a plurality of hierarchies of documents, a classification for that hierarchy of documents and a feature derived from a root document of that hierarchy of documents; and
   after generating the aggregate feature for the root document, adding the aggregate feature of the root document to the training set to represent a feature for the hierarchy of documents.

8. The method of claim 7 including training a classifier using the training set with the added aggregate feature.

9. A computer-readable storage device containing instructions for controlling a computing device to generate a word feature vector from a hierarchy of web pages of a web site, the hierarchy specifying parent/child relations between web pages as defined by uniform resource locators for web pages of the web site, by a method comprising:
   generating a word feature vector for web pages of the web site; and
   combining the generated word feature vectors of the web pages of the web site into an aggregate word feature vector to represent the web site, by, for each web page, combining the generated word feature vector for that web page with the generated word feature vectors for descendent web pages of that web page to generate an aggregate word feature vector for that web page, the descendent web pages of that web page defined by the uniform resource locators of that web page and the descendent web pages, wherein the contribution of the word feature vector of a descendent web page decreases based on increased distance along the parent/child relations from that web page;
   providing a training set having, for each of a plurality of web sites, a classification for that web site and a word feature vector derived from a root web page of that web site;
   after combining the generated word feature vectors, adding the aggregate word feature vector for the root web page to the training set to represent a word feature vector for the web site; and
   training a classifier using the training set with the added aggregate word feature vector.

10. The computer-readable storage device of claim 9 wherein elements of the word feature vector represent frequencies of keywords.

11. The computer-readable storage device of claim 9 wherein the word feature vector for a web page is an aggregate of the word feature vector of the web page and descendent web pages.

12. The computer-readable storage device of claim 9 wherein the aggregate word feature vector is derived from descendent web pages of a web page in the training set.

13. The computer-readable storage device of claim 9 wherein the aggregate word feature vector for a web page is based on features of both ancestor and descendent web pages.

14. The computer-readable storage device of claim 9 wherein a first web page is a parent of a second web page when a second uniform resource locator for the second web page contains a first uniform resource locator as its prefix followed by additional information identifying the second web page.

15. The computer-readable storage device of claim 9 wherein a first web page is a parent of a second web page when the first web page contains a uniform resource locator for the second page.

16. A computer system for generating a feature from a hierarchy of documents, comprising:
   a memory storing computer-executable instructions for:
      accessing a hierarchical organization of the documents, the hierarchical organization specifying parent/child relations between documents, one of the documents being a root document of the hierarchical organization that has no parent document, some of the documents of the hierarchical organization being leaf documents that have no child documents, each document other than the root document and the leaf documents having both a parent document and a child document, the parent/child relations occurring when a parent document contains a reference to a child document;
      generating a feature for each of the documents in the hierarchical organization of documents; and
      for each document, generating an aggregate feature from the generated features of the documents to represent the feature for the document by combining the generated feature for that document with the generated aggregate features for child documents of that document to generate an aggregate feature for that document by summing the features for child documents of that document, dividing that sum by the number of child documents to generate a quotient, and multiply the quotient by a weighting factor so that each document in the hierarchical organization with a child document has an aggregate feature derived from the generated feature for that document and the aggregate features of the child documents of that document; and a processor for executing the computer-executable instructions stored in the memory.

17. The computer system of claim 16 wherein the feature represents frequencies of keywords within a document.

18. The computer system of claim 16 wherein the feature for a document is an aggregate of the features of ancestor and descendent documents.

19. The computer system of claim 16 wherein the documents are web pages.

* * * * *